United States Patent [19]

Numakura

[11] 3,717,725

[45] Feb. 20, 1973

[54] TELEVISION SIGNAL RECORDING SYSTEM WITH COLOR INFORMATION RECORDED ON A LOW FREQUENCY CARRIER AT REDUCED AMPLITUDE WITH RESPECT TO THE LUMINANCE INFORMATION

[75] Inventor: Toshihiko Numakura, Tokyo, Japan

[73] Assignee: Sony Corp., Tokyo, Japan

[30] Foreign Application Priority Data

July 19, 1966 Japan..........................41/47208

[22] Filed: Aug. 5, 1970

[21] Appl. No.: 61,388

Related U.S. Application Data

[63] Continuation-in-part of Ser. No. 654,632, July 19, 1967, abandoned.

[52] U.S. Cl...........................178/5.4 CD, 178/6.6 A
[51] Int. Cl...........................................H04m 5/84
[58] Field of Search......................178/5.4 CD, 6.6 A

[56] References Cited

UNITED STATES PATENTS 3,424,860 1/1969 Delvaux............................178/6.6 A

OTHER PUBLICATIONS

Electronics Vol. 38 No. 6 March 22, 1965 pp. 104–6

Principles of Color Television, by McIlwain, Knox and Dean, Charles, John Wiley & Sons Inc. 1956 pp. 266–267

*Primary Examiner*—Robert L. Griffin
*Assistant Examiner*—Donald E. Stout
*Attorney*—Lewis H. Eslinger, Alvin Sinderbrand and Curtis, Morris & Safford

[57] ABSTRACT

A standard color television signal which has a luminance signal component and at least two chrominance signal components is recorded with one head on a magnetic tape or other medium. The chominance signal components are combined alternately into a line sequential chrominance signal, and the luminance signal component and line sequential chrominance signal are modulated on separate carriers having relatively high and low carrier frequencies, respectively, to form two independent modulated carriers which are mixed or combined to constitute a single channel composite signal recorded by the one head and in which the carrier modulated with the line sequential chrominance signal has an amplitude of from one-fifth to one-third the amplitude of the carrier modulated with the luminance signal component. During reproduction, the reproduced composite signal is separated into the luminance signal component and the line sequential chrominance signal, and the latter is separated into the two chrominance signal components with the aid of a delay line.

2 Claims, 22 Drawing Figures

INVENTOR.
TOSHIHIKO NUMAKURA
BY
Lewis H. Eslinger
ATTORNEY

INVENTOR.
TOSHIHIKO NUMAKURA

BY Lewis B. Eslinger
ATTORNEY

INVENTOR.
TOSHIHIKO NUMAKURA

BY [signature]
ATTORNEY

INVENTOR.
TOSHIHIKO NUMAKURA
BY
[signature]
ATTORNEY

TELEVISION SIGNAL RECORDING SYSTEM WITH COLOR INFORMATION RECORDED ON A LOW FREQUENCY CARRIER AT REDUCED AMPLITUDE WITH RESPECT TO THE LUMINANCE INFORMATION

This application is a continuation-in-part of U.S. Pat. application, Ser. No. 654,632, filed July 19, 1967 now abandoned.

This invention relates generally to the recording and reproducing of television signals, and more specifically to a color video tape recorder for magnetically recording video signals on a single channel track.

In the transmission of color television signals in accordance with the NTSC system three independent transmission channels are used, one each for the red, green and blue signals. In the NTSC system the red, green and blue signals are transformed into Y, I and Q signal components which are then multiplexed and transmitted through one channel. The Y or luminance signal component has a band width of 4.1 MC and is composed of the red, green and blue picture outputs. The chrominance signal component I has a band width of 1.5 MC and the chrominance signal component Q has a band width of 0.5 MC.

One prior art system that has been used for recording color television signals utilizes two magnetic heads. In such a system one component signal of a picture signal such as the Y signal component is recorded on one track while the two remaining I and Q signal components are recorded on another track of the video tape recording system. The difficulty with such prior art systems, however, is that they use an excessive amount of magnetic tape and there is difficulty with compatability in being able to record on one machine and reproduce on another. A system of this type is described in U.S. Pat. No. 3,234,323.

In another prior art form of video tape recorder used for recording a color television signal, the composite signal is converted to a frequency modulated form and then recorded on a single channel of a magnetic medium by using a single magnetic head. This type of system has the advantage of utilizing less magnetic tape. The disadvantages of such a prior art system, however, are that a beat frequency is frequently generated during the mixing of the color subcarrier and the frequency modulation carrier during modulation and demodulation. This beat frequency is caused by the color subcarrier which is 3.58 MC. In addition, in the utilization of such a prior art system it has been difficult to faithfully reproduce the respective signals because of the phase changes of the color subcarrier which result from fluctuations in the speed and movement of the magnetic tape. Another disadvantage of such a prior art system is that a large band width is required.

In still another prior proposal for recording and reproducing color television signals, for example, as disclosed in U.S. Pat. No. 3,424,860, the luminance and chrominance components of such signals respectively modulate individual carriers, and the modulated carriers are then combined to provide a composite signal which is recorded by a single head on a magnetic tape. However, the carrier modulated with the luminance signal component has a relatively low frequency, and the carriers modulated with the chrominance signal components have substantially higher frequencies, with a view to insure that the luminance signal component will be recorded in a frequency band within the first response loop of the head, while the chrominance signal components will be recorded in frequency bands within the second and/or higher order loops of the response curve. Further, the several modulated carriers are recorded at about the same level. However, the recording efficiency at lower frequencies is inferior to that at higher frequencies, so that the foregoing system records the luminance signal component which is most important for quality of the color television picture, under conditions that reduce the efficiency of recording such signal component. Further, recording the modulated carriers at about the same level may give rise to cross modulation between the chrominance and luminance signal components.

Accordingly, it is the primary object of the present invention to provide a television signal recording and reproducing system utilizing a single recording channel but which does not have the disadvantages of prior art single channel color television signal recording systems.

Another object is to provide a color television signal recording and reproducing system using a line sequential chrominance signal but which does not generate any undesirable beat frequencies.

A further object is to provide a color television signal recording and reproducing system using a line sequential chrominance signal but which utilizes a smaller band width than prior art single channel recording systems.

In accordance with an aspect of this invention, the chrominance signal components of a standard color television signal are combined alternately for one-line segments, each into a line sequential chrominance signal, and the luminance signal component and line sequential chrominance signal are modulated on separate carriers having relatively high and low carrier frequencies, respectively, to form two independent modulated carriers which are mixed or combined to constitute a single channel composite signal recorded by a single head, and in which the carrier modulated with the line sequential chrominance signal has an amplitude of from one fifth to one third the amplitude of the carrier modulated with the luminance signal component. Since the carrier for the luminance signal component has the higher frequency, such signal component is recorded with the optimum efficiency to insure that the reproduced color television picture will be of high quality. Further, the high frequency carrier for the luminance signal component gives a high frequency biasing effect with respect to the lower frequency carrier modulated with the line sequential chrominance signal, so that good linearity is achieved in recording and reproducing the chrominance signal even though the latter is recorded with a relatively small amplitude. Due to the recording of the carrier modulated with the line sequential chrominance signal at a relatively low level, cross modulation between that signal and the luminance signal component is avoided even though the two carrier frequencies are situated so as not to be too far apart, and thereby to minimize the band width required for recording the signals.

The above, and further objects, features and advantages of the present invention, will become fully apparent from the following detailed description of a preferred embodiment of the invention which is to be read in conjunction with the accompanying drawings in which.

Figure 1:
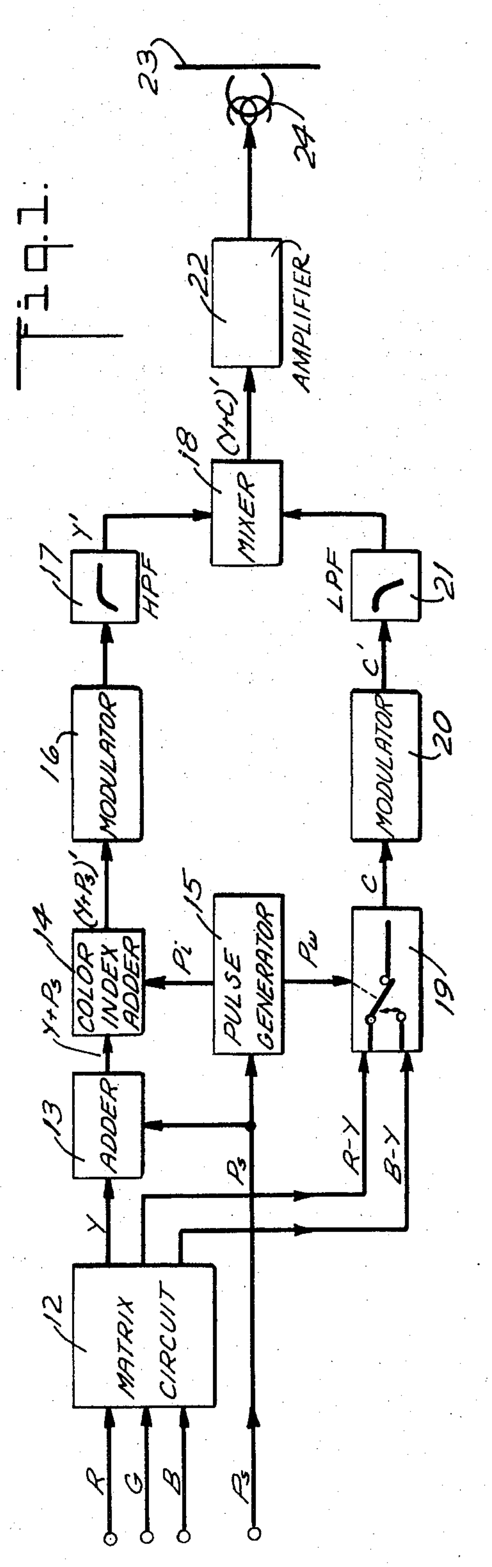
FIG. 1 is a block diagram of the recording section of a color television tape recorder to be utilized in conjunction with the color television signal recording and reproducing system of the present invention.
Figure 3A:
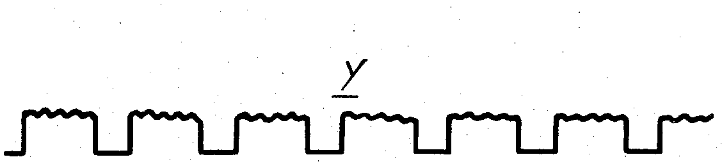
FIGS. 3A–3L illustrate the signals generated at various portions of the color television signal recording and reproducing system of the present invention.

Referring now to the drawings, and specifically to FIG. 1, there is illustrated the recording section for a color television tape recorder in accordance with the present invention. The red, green and blue television or video signals are simultaneously applied to a matrix circuit 12. The matrix circuit 12 produces a luminance signal component Y and two color difference signals or chrominance signal components identified as R-Y and B-Y. The luminance signal component Y is illustrated in FIG. 3A.

Figure 3B:
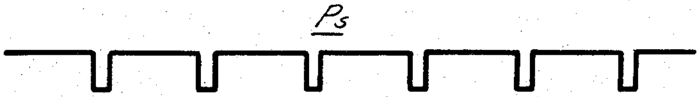
Figure 3C:
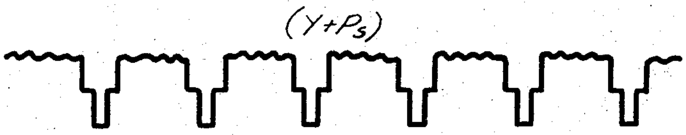

The luminance signal component Y and a synchromizing pulse $P_S$ are fed to an adder 13 the output of which is the luminance signal component plus a synchromizing pulse $(Y+P_S)$, as illustrated in FIG. 3C. The synchronizing pulse $P_S$ is illustrated in FIG. 3B.

Figure 3D:
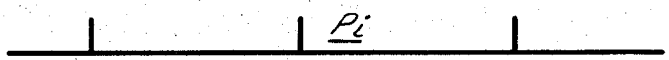

The synchronizing pulse $P_S$ is also applied to the pulse generator 15 the output of which is an index pulse $P_i$ which is illustrated in FIG. 3D. The index pulse $P_i$ is dependent for its formation on the synchronizing pulse $P_S$ and therefore the index pulse $P_i$ is synchronized with every other pulse of the synchronizing pulse $P_S$.

Figure 3E:
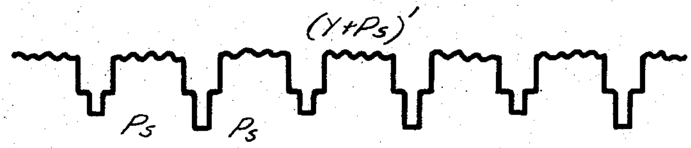

As illustrated in FIG. 1 the index signal pulse $P_i$ and the luminance signal $Y+P_S$ are both applied to a color index adder 14. The output of the color index adder 14 is designated as $(Y+P_S)'$ and this signal is illustrated in FIG. 3E. As can be seen from a comparison of FIGS. 3C and 3E, the synchronizing pulse of the luminance signal $(Y+P_S)$ is amplitude modulated every other field in the color index adder 14. The modulated synchronizing pulses $P'_S$ are illustrated in FIG. 3E.

Figure 4A:
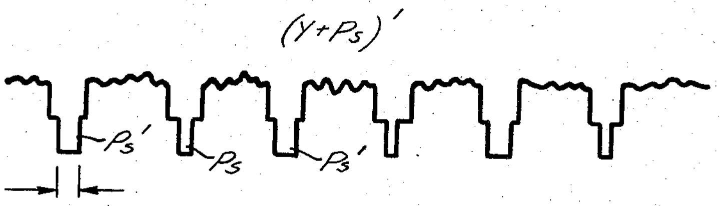
FIGS. 4A–4C illustrate modifications of various of the wave forms illustrated in FIG. 3.
Figure 4B:
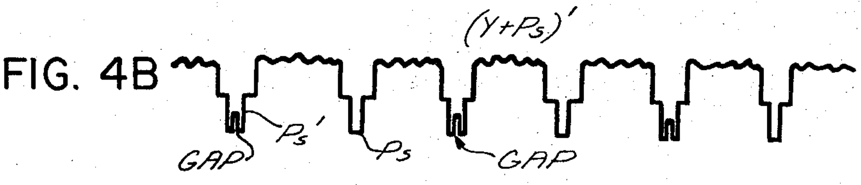
Figure 4C:
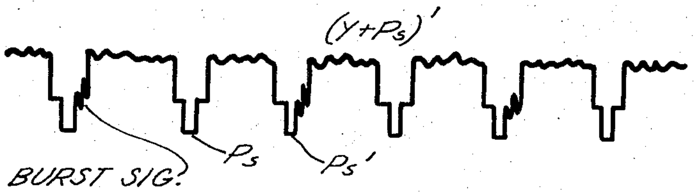

In FIG. 4 there are illustrated other examples of the modulated synchronizing pulse $P'_S$. In FIG. 4A there is illustrated a pulse width modulated synchronizing pulse (PWM) while in FIG. 4B the modulated synchronizing pulses are shown as having a gap portion. The synchronizing pulses illustrated in FIG. 4C have an indexing color burst signal. As can be seen in FIGS. 3E and 4 the luminance signals $(Y+P_S)'$ have a sychronizing pulse which is amplitude modulated every other field (or every two H).

Figures 5A, 5B, 5C, 5D:
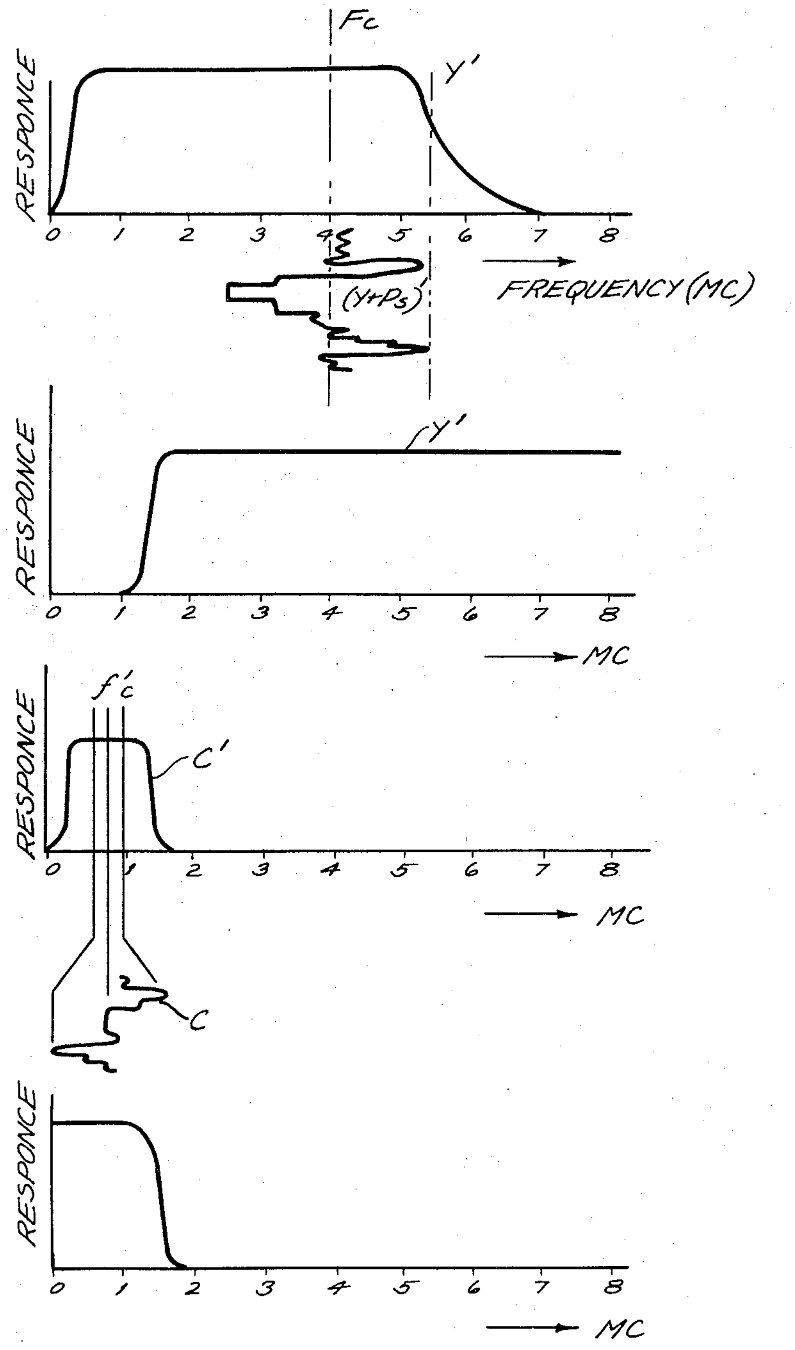
FIGS. 5A–5E illustrate the characteristics of some of the components used in the color television signal recording and reproducing system of the present invention.

The luminance signal $(Y+P_S)'$ is used in a modulator 16 to modulate the frequency or phase of a carrier of, for example, 4 MC. The frequency response or RF characteristic of the modulator 16 is illustrated in FIG. 5A in which the carrier frequency $(F_C)$ is designated as 4.0 MC and the top of the synchronizing portion and of the peak of the white level are designated respectively as 2.5 MC and 5.5 MC.

The carrier modulated by the luminance signal $(Y+P_S)'$ is applied to the mixer 18 through a high-pass filter (HPF) 17. In FIG. 5B there is illustrated the characteristic curve of the high-pass filter 17. In the high-pass filter 17 the 3 db downpoint from the top level and the null point are preferably selected to be respectively 1.3 and 1.0 MC. The resulting band width from 1.3 to 2.5 MC of the high-pass filter 17 is important from the viewpoint of a side band of the carrier modulated by the luminance signal $(Y+P_S)'$.

Figure 3F:
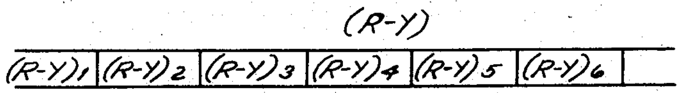
Figure 3G:
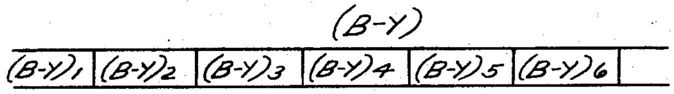

The color difference signals or chrominance signal components R-Y and B-Y produced in the matrix circuit 12 are illustrated in FIGS. 3F and 3G as being divided into line intervals. In FIGS. 3F and 3G the suffix numbers 1, 2, 3, etc. correspond to the line number.

The color difference signals R-Y and B-Y are fed to a switcher circuit 19 which produces a single channel line sequential color difference or chrominance signal C, which is defined as the signal obtained by passing the R-Y signal for one line interval and the B-Y signal for the next interval and then repeating this alternating sequence. The switcher 19 also has applied thereto a switching pulse $P_W$ which is generated in the pulse generator 15. The switching pulse $P_W$ is synchronized with the indexing pulse $P_i$ and with the synchronizing pulse $P_S$ and alternately switches between the color difference signals R-Y and B-Y.

Figures 3H, 3I, 3J:
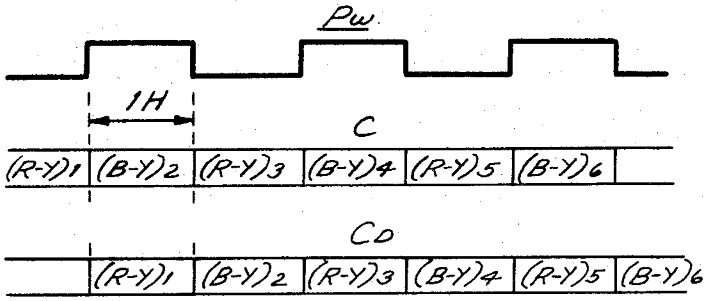
Figure 3K:
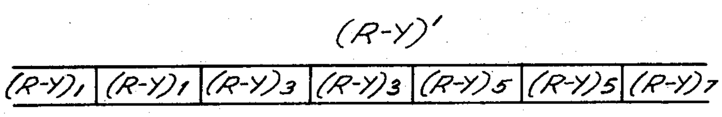
Figure 3L:
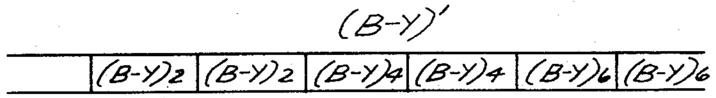

As a result of the operation of the switcher 19 a line sequential single channel color difference or chrominance signal such as illustrated in FIG. 3I is obtained. As indicated by the subscripts, this signal is made up of R-Y components, only, for odd lines and B-Y components, only, for even lines. The switching pulse $P_W$ is illustrated in FIG. 3H. As can be seen from an examination of FIG. 3 the R-Y and B-Y signals always have a specific time relationship to the color index pulse $P'_S$ and it is therefore simple to detect whether or not red or blue signals exist.

The line sequential signal C illustrated in FIG. 3I is applied to a modulator 20 which produces a frequency modulated signal C' which has a center or carrier frequency $F'_C$ of, for example, 0.8 MC. The frequency response or RF characteristic of the modulator 20 is illustrated in FIG. 5C.

The modulated line sequential chrominance or color difference signals C' are next applied to the mixer 18 through a low-pass filter (LPF) 21. The characteristic curve of the low-pass filter 21 is illustrated in FIG. 5D. The three db downpoint of the low-pass filter 21 in the illustrated example has been selected to be approximately 1.3 MC.

Figure 5E:
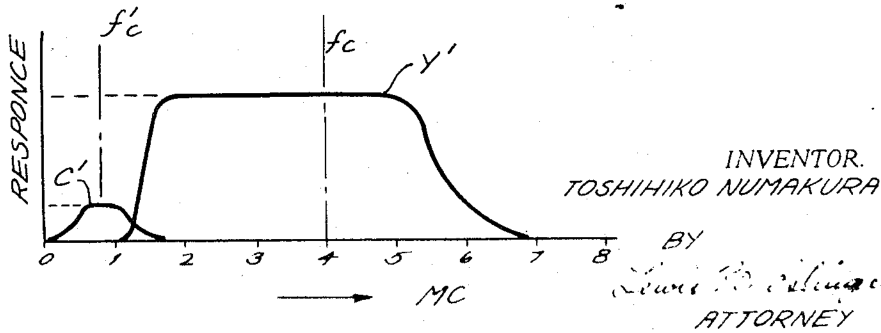

The output of the mixer 18 is a composite or combination of the chrominance and luminance signals $(Y+C)'$ the frequency characteristic of which is illustrated in FIG. 5E. As can be seen from an examination of FIG. 5E, the amplitude of the chrominance signal C' is, prior to recording, reduced until it is approximately one fifth to one third of the amplitude of the luminance signal Y'.

The combined chrominance and luminance signals or composite $(Y+C)'$ from the output of the mixer 18 are applied to a magnetic recording head 24 through an amplifier 22. As a result of this a single channel color video track is formed on the magnetic tape 23 in the usual manner.

During reproduction, the recorded composite signal (Y+C)′ is reproduced from the tape 23 by the head 24′ which is usually the same as the recording head 24. The reproduced composite signal is simultaneously fed to a high-pass filter (HPF) 17′ and a low-pass filter (LPF) 21′ through an amplifier 12′. The filters 17′ and 21′ have respectively the same characteristics as those illustrated in FIGS. 5B and 5D. At the output terminals of the filters 17′ and 21′ the modulated signals Y′ and C′ are respectively produced.

The Y′ signal is applied to the demodulator 16′ through a limiter 15 and the luminance signals $(Y+P_S)'$ which include the synchronizing pulses $P_S$ and $P_S'$ are reproduced at the output of the demodulator 16′.

The luminance signals are then applied to a clipping circuit 27 through a suitable delay circuit 26. At the clipping circuit 27 a synchronizing pulse is subtracted. As a result, the luminance signals illustrated in FIG. 3A are obtained after clipping the synchronizing signals $P_S$ and $P_S'$. The resultant signal is then applied to the matrix circuit 12′.

The chrominance signals C′ obtained from the low-pass filters 21′ are applied to a demodulator 20′ through a limiter 28 in order to obtain the chrominance signal C. The sequential chrominance signals C obtained from the output of the demodulator 20′ are illustrated in FIG. 3I.

The chrominance signals C obtained from the output of the demodulator 20′ are applied directly to a switcher 19′. The same chrominance signals C from the output of the demodulator 20′ are also applied to the switcher 19′ through a delay line circuit 29 which delays the signal one field (1H). It can therefore be seen that the switcher 19′ has applied thereto the chrominance signals C illustrated in FIG. 3I as well as the delayed signals $C_D$ illustrated in FIG. 3J.

The switcher 19 is controlled by the pulse $P_W$ illustrated in FIG. 3H which is produced in the pulse generator 30. As can be seen from FIG. 3I, the reproduced chrominance signals C have only every other chrominance line and the ones in between, such as $(R\text{-}Y)_2$, $(B\text{-}Y)_3$, $(R\text{-}Y)_4$, $(B\text{-}Y)_5$, etc., have been eliminated. It therefore becomes necessary to reproduce chrominance signals corresponding in time to the skipped chrominance signals, and this is done by the switcher 19′. By means of the switcher 19′ the sequential chrominance signals shown in FIGS. 3K and 3L, i.e., the sequential chrominance signals (R-Y)′ and (B-Y)′ are reproduced rather than the signals illustrated in FIGS. 3F and 3G, i.e., (R-Y) and (B-Y). It can therefore be seen that the delayed chrominance signals are substituted for the skipped signals so that the signals (R-Y)′ and (B-Y)′ each constitute one-line segments of the respective chrominance components spaced one line interval apart but joined into continuous chrominance signals by means of delayed replicas of the immediately preceding one line segments of the respective chrominance signals.

Figure 2:
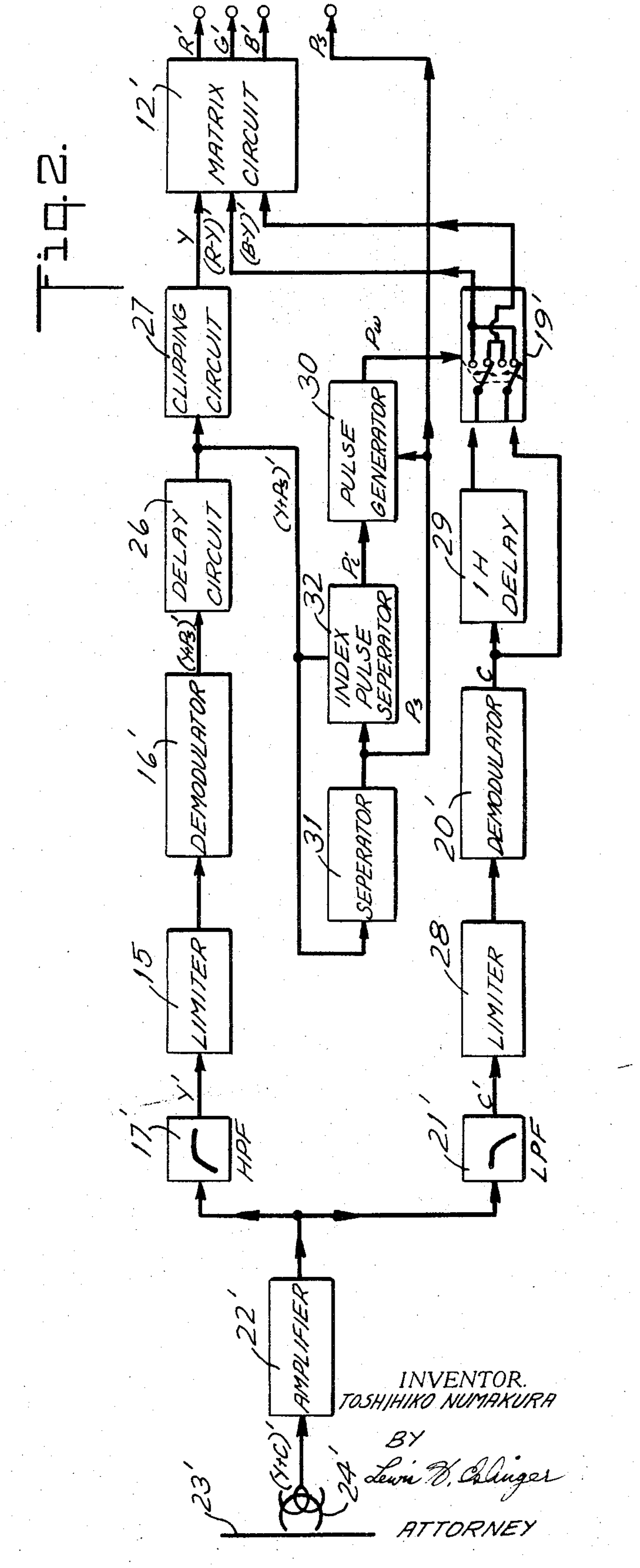
FIG. 2 is a block diagram of the reproducing section of the color television tape recorder to be utilized in conjunction with the color television signal recording and reproducing system of the present invention.

As can be seen from FIG. 2, the switching pulse $P_W$ is obtained by applying the output of delay circuit 26, which is $(Y+P_S)'$, to a synchronizing signal separator 31 which produces a horizontal synchronizing pulse $P_S$. This synchronizing pulse $P_S$ together with the signal $(Y+P_S)'$ from the delay circuit 26 is supplied to an index pulse separator 32 from which a color index pulse $P_i$, such as shown in FIG. 3D, is obtained. The color index pulse $P_i$ together with the pulse $P_S$ from the separator 31 are then applied to the pulse generator 30 from which the switching pulse $P_W$ is obtained.

The reformed sequential chrominance signals (R-Y)′ and (B-Y)′ are then applied to the matrix circuit 12′ together with the luminance signal Y. The matrix circuit 12′ then reproduces as its output the color signals, R′, G′ and B′. These signals together with the synchronizing pulse $P_S$ can then be used in any conventional color reproducing system to reproduce a color picture for monitoring.

In the foregoing example, the frequency band of the luminance signals Y′ has occupied a much larger band width than that of the chrominance signals C′, as illustrated in FIG. 5E, but it is to be understood that this situation can be reversed with the chrominance signals C′ occupying a greater band width than the luminance signals Y′. In addition, not only the R-Y and B-Y signals can be utilized, but any other desired chrominance signals selected from, for example, the group of (R-Y), (G-Y) and (B-Y) or the chrominance signals I and Q of the NTSC standards, may also be utilized.

It will be appreciated that, in the above described system according to this invention, the carrier for the luminance signal component has a frequency, for example 4.0 MC, that is higher than the frequency, for example 0.8 MC, of the carrier for the line sequential chrominance signal, and, therefore, the luminance signal component is recorded and reproduced with optimum efficiency. Since the luminance signal component of the color television signal is of greatest importance in providing a high quality television picture, the recording and reproducing of that component of the signal with optimum efficiency contributes to the attainment of the desired high quality picture. Further, the high frequency carrier for the luminance signal component provides a high frequency biasing effect with respect to the lower frequency carrier modulated with the line sequential chrominance signal so as to insure good linearity in recording and reproducing the chrominance signal even where the latter is recorded at a low level, for example, at a level of one fifth to one third the level at which the luminance signal is recorded. Thus, it is possible to record the chrominance signal at the low level relative to the level of the luminance signal to avoid cross modulation therebetween, even when the carrier frequencies $f_c$ and $f_c'$ are selected so as not to be too far apart and thereby to minimize the band width required for recording the signals.

Although an illustrative embodiment of the invention has been described in detail herein with reference to the accompanying drawings, it is to be understood that the invention is not limited to that precise embodiment, and that various changes and modifications may be effected therein without departing from the scope or spirit of this invention.

What is claimed is:

1. A recording system for recording with one head on a magnetic medium a signal having a luminance signal component and at least two chrominance signal components, said system comprising means for combining one-line segments of said chrominance signal components alternately to form a line sequential chrominance signal, means for modulating said luminance signal component and said line sequential chrominance signal on separate carriers having relatively high and low carrier frequencies, respectively, to form at least two independent modulated carriers, mixer means for combining said modulated carriers to form a single channel composite signal in which the amplitude of the carrier modulated with the line sequential chrominance signal is from one-fifth to one-third of the amplitude of the carrier modulated with the luminance signal, and head means connected to said mixer means for recording said composite signal on a magnetic medium.

2. A single channel recording and reproducing system for recording on and reproducing from a magnetic medium a color television signal having a luminance signal component and at least two chrominance signal components, said system comprising: means for combining one-line segments of said chrominance signal components alternately to form a line sequential chrominance signal; means to frequency modulate a first carrier having a relatively high frequency with said luminance signal component; means to frequency modulate a second carrier having a lower frequency with said line sequential chrominance signal to form at least two independent modulated carriers; mixer means for combining said modulated carriers to form a single channel composite signal in which the amplitude of the carrier modulated with the line sequential chrominance signal is from one-fifth to one-third of the amplitude of the carrier modulated with the luminance signal; and head means connected to said mixer means for recording said composite signal on a magnetic medium and for reproducing said composite signal; filter means connected to said head means to separate the reproduced composite signal into said luminance signal component and said line sequential chrominance signal; delay switcher means to convert said line sequential chrominance signal into one-line segments of said chrominance signal components spaced one line interval apart and joined together by delayed replicas of the respective immediately preceding one-line segments; and means for combining said reproduced chrominance signal components and said luminance signal component to produce said color television signal.

* * * * *